(12) United States Patent  
LaLonde et al.

(10) Patent No.: US 6,240,328 B1
(45) Date of Patent: May 29, 2001

(54) MANUFACTURING METHOD FOR ASSEMBLING PRODUCTS BY GENERATING AND SCHEDULING DYNAMICALLY ASSEMBLY INSTRUCTIONS

(75) Inventors: John D. LaLonde; Craig A. MacDonnell, both of Mesa; David Cucuzella, Gilbert, all of AZ (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 08/430,111

(22) Filed: Apr. 27, 1995

Related U.S. Application Data

(63) Continuation of application No. 08/179,639, filed on Jan. 10, 1994.

(51) Int. Cl.[7] .................................................. G06F 19/00
(52) U.S. Cl. .............................. 700/95; 700/96; 700/97; 700/100
(58) Field of Search ...................................... 364/468, 401, 364/402, 403, 478, 578; 700/95, 96, 97, 100

(56) References Cited

U.S. PATENT DOCUMENTS

| | | | | |
|---|---|---|---|---|
| 4,887,218 | * | 12/1989 | Natarajan | 364/468 |
| 4,896,269 | * | 1/1990 | Tong | 364/468 |
| 5,014,208 | * | 5/1991 | Wolfson | 364/468 |
| 5,088,045 | * | 2/1992 | Shimanaka et al. | 364/468 |
| 5,089,970 | * | 2/1992 | Lee et al. | 364/468 |
| 5,148,370 | * | 9/1992 | Litt et al. | 364/468 |
| 5,241,482 | * | 8/1993 | Iida et al. | 364/468 |
| 5,341,304 | * | 8/1994 | Sakamoto et al. | 364/468 |

* cited by examiner

Primary Examiner—Reba I. Elmore
(74) Attorney, Agent, or Firm—Scott Kevin Pickens

(57) ABSTRACT

A manufacturing method is provided for assembling a number of products by generating and scheduling dynamically a number of assembly instructions from modeling information. The manufacturing method generates exact assembly instructions for the full theoretical scope of the product line. The generated instructions do not require any human lookup or inference. Even exact instructions for configured components of the final product are generated. Which instructions are required to build the final product are derived from a "model" of the product.

19 Claims, 1 Drawing Sheet

MANUFACTURING METHOD FOR ASSEMBLING PRODUCTS BY GENERATING AND SCHEDULING DYNAMICALLY ASSEMBLY INSTRUCTIONS

This application is a continuation of prior application Ser. No. 08/179,639, filed Jan. 10, 1994.

TECHNICAL FIELD

This invention relates generally to methods for assembling products and, in particular, to manufacturing methods for assembling a number of products by generating and scheduling dynamically a number of assembly instructions from modeling information.

BACKGROUND OF THE INVENTION

A conventional and common approach to manufacturing a configurable product is to prioritize components of the product and one by one manually lookup a placement and/or configuration of the component itself in paper-based tables. In addition to the tables, a set of static work instructions may be provided to give basic guidelines on how to assemble the product.

An advanced version of the conventional approach is to have electronic tables and electronic instructions. This approach still requires the assembler to determine which table to use, which placement and/or configuration to use, and how to apply the general guideline or instruction to the specific case. Some of the deficiencies of these conventional methods are the number of opportunities for human error, the extra time involved to determine proper assembly of a product, and the limitation of the scope of the product line. The scope of the product line would be limited because (based on the tables) there would be exactly one overall assembly for any collection of components. Therefore, there is a significant need for a manufacturing method which overcomes these deficiencies.

SUMMARY OF THE INVENTION

The present invention allows exact assembly instructions to be generated for the full theoretical scope of the product line. In the present invention, there may be greater than a trillion possible assemblies for a given collection of components. The generated instructions do not require any human lookup or inference. Even exact instructions for configured components of the final product are generated. Which instructions are required to build the final product are derived from a "model" of the product.

Thus, it is an advantage of the present invention to generate dynamically step-by-step assembly instructions on a per configuration basis for each product being manufactured in a manufacturing facility.

Another advantage of the present invention is to schedule dynamically assembly instructions across one to any number of different assembly stations.

Yet another advantage of the present invention is to provide step-by-step assembly instructions in a human readable form along with detailed annotated picture quality images.

It is also an advantage of the present invention to allow a user to customize a product and to assemble the final product according to the customized requirements without any additional documentation or human intervention.

Another advantage of the present invention to schedule dynamically the assembly instruction for assembling a number of different products across multiple assembly stations based on workload or priority of which product needs to be built first.

Another advantage of the present invention is to lower the level of technical expertise required for assembling products.

It is also an advantage of present invention to remove all paperwork and human intervention required for assembling customized product configurations.

A manufacturing method is provided that is executed by a computer as part of a computer program for assembling a product from a plurality of assembly instructions. The computer is coupled to a plurality of assembly stations. The method comprises the steps of (a) generating dynamically the assembly instructions for building the product from modeling information; and (b) scheduling dynamically the assembly instructions among the assembly stations.

DESCRIPTION OF THE PREFERRED EMBODIMENTS

Figure 1:
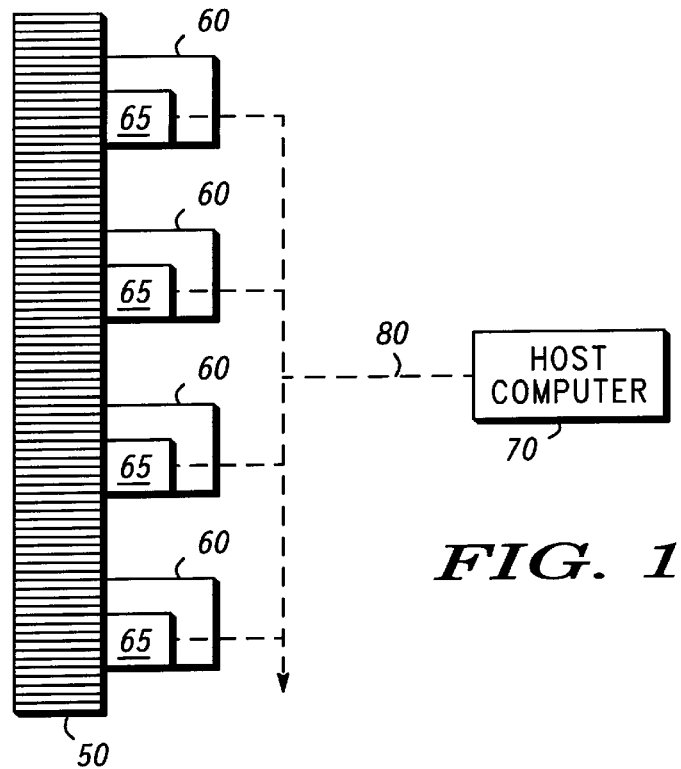
FIG. 1 shows a layout of a manufacturing facility in accordance with a preferred embodiment of the present invention.

FIG. 1 shows an example of a layout of a manufacturing facility in accordance with a preferred embodiment of the present invention. Conveyor 50 transports a, number of different products from one assembly station 60 to another assembly station 60. Each assembly station comprises displays 65 and a keyboard (not shown). Displays 65 are computer displays connected to a host computer 70 via a computer network 80. Displays 65 are used to display, show or otherwise provide the human (or possibly robotic) assembler the assembly instructions. The number of workstations can vary. Displays 65 may be a touch screen display which eliminates the need for having the keyboard.

Assembly stations 60 and displays 65 are manufactured by Motorola, Inc. However, any type of assembly station and displays may be used. Although host computer 70 is a commercially available Motorola 88K RISC processor from the Series 8000, any host computer from other commercial vendors may be used. Computer network 80 is a ethernet-based local area network (LAN). Any type of computer network 80 may be used to connect assembly stations 60 to host computer 70.

Figure 2:
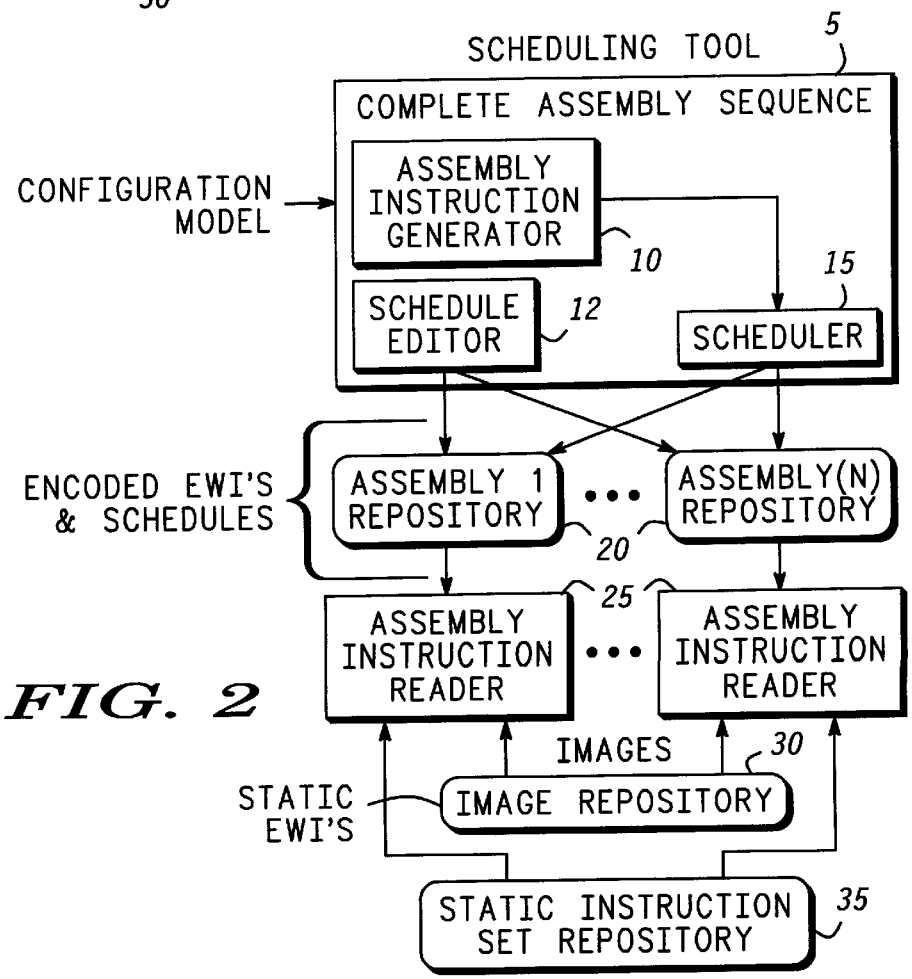
FIG. 2 shows a manufacturing method for generating and scheduling dynamically a number of customized products to be built in a manufacturing facility in accordance with a preferred embodiment of the present invention.

FIG. 2 shows a manufacturing method for generating and scheduling dynamically a number of customized products to be built in a manufacturing facility in accordance with a preferred embodiment of the present invention. Basically, as shown in FIG. 2, configuration models are received by scheduling tool 5. The models are converted into an exact sequence of encoded work instructions (EWI's), distributed to selected assembly stations and displayed at the appropriate assembly station 60 on the assembly line.

Scheduling tool 5 is responsible for generating and scheduling dynamically each of the assembly instructions for each of the products at each of the assembly stations 60. Scheduling tool 5 comprises assembly instruction generator 10, schedule editor 12 and scheduler 15. Assembly instruction generator 10 receives a configuration model for building a particular product and converts the configuration model into a sequence of EWI's. EWI's represent the complete assembly sequence needed to build a product.

Scheduling tool 5 is a computer program executed by host computer 70. Assembly instruction generator 10, schedule editor 12, and scheduler 5 are all functional pieces of scheduling tool 5. There is a base of information that contains a set of abstract assembly steps for each component and subassembly. The information base currently is embedded in the source code for the instruction generator. The information base could also reside outside of the scheduling tool. The main function of assembly instruction generator 10 is to convert a configuration model into a set of exact assembly instructions.

The configuration model comprises information about how parts, pieces or components of a product fit together and how it is configured in the product. The configuration model is represented as ASCII data. Contained in the data is a hierarchical physical description of the configuration, the order number associated with the configuration, information about independent sub-systems within the configuration, connectivity of interrelated components, and specific attributes of individual components in the configuration. Example 1 shows an abstract example of the data format for the configuration model.

<order number>

<component information line 1>

. . .

<component information line n>

EXAMPLE 1

A "component information line" contains an item tag followed by zero or one physical location field, zero or more property fields, and zero or one connection field. The physical location gives precise placement information for the component. Property fields are comprised of a property tag and the property data separated by a period. Examples of property fields would be color, component configuration information, sub-system identification, or license information. The connection field contains all the locations the item is to be connected to. The locations in the connection field are separated by colons. If connections of the component can be inferred by the physical location of the component, no connection field is supplied.

<component tag>*L*<hierarchical location>*P*<property tag>.<property data>

<component tag>*C*<location>:<location>

EXAMPLE 2

Example 2 shows two abstract examples of component information lines. The *L* identifies a physical location field. The *P* identifies a property field. The *C* identifies a connection field. Example 3 shows a specific instance of a configuration model.

61333

M900*L*0

P900F*L*0.0

MVME334FAP*L*0.0.1*P*A.0*P*SS.vme-0

MVME328FXTP-002*L*0.0.2*P*A.0*P*SS.vme-0*P*SS.scsi-1*P*SS.scsi-2

P900F*L*0.1

P713F*L*0.1.1*P*A.0*P*SS.vme-0*P*SS.scsi-0

MVME187-33 MHz*L*0.1.2*P*A.0*P*SS.vme-0

P901F*L*0.2

P868F*L*0.2.2*P*A.0*P*SS.scsi-0

P868F*L*0.2.3*P*A.1*P*SS.scsi-0

P867F*L*0.2.4*P*A.2*P*SS.scsi-0

TERM*C*0.2.-2:

SHORT*C*0.1.1.-1:0.2.-1:

EXAMPLE 3

Assembly instruction generator 10 of scheduling tool 5 converts the configuration model into an exact sequence of EWI's (encoded work instructions) required to obtain, assemble and configure the components that comprise the final product. Associated with each component is zero or more assembly steps. The base information is contained in assembly instruction generator 10.

Embedded in the source code of assembly instruction generator 10 is the component and sub-assembly information base. The information base is maintained through the use of an administration tool explained in further detail below. This tool allows a non-programmer to update the information about the assembly steps required for a component or sub-assembly. The assembly steps may be abstract or variable. The variability is resolved by extracting the information from the configuration model when it is processed by assembly instruction generator 10. Once the information update is complete, the administration tool writes out new source code for assembly instruction generator 10.

The administration tool is a separate, independent program. This program is used to create abstract EWI's for individual products and sub-assemblies, and other information (variable graphic names etc.) that comprise the information base. The administration tool writes out source code that is part of the source code for scheduling tool 5. For example, if the source for scheduling tool 5 is contained in files A, B and C, where file B contains the information base code, then if modifications/additions are made using the administration tool, a new file B would be written out. By using the programming language Scheme, one can start the program by either loading source files (which are compiled on the fly) or by loading pre-compiled versions of the files. In actuality, the administration tool can write out the source file B.ss and compile the file into B.so or effectively B.

In the event a final product requires an assembly to be completed in separate builds, a separate sequence of EWI's will be generated for each build. Assembly instruction generator 10 resolves any variability in the number of steps or variability in any given step based on the configuration model and the information base contained in the assembly instruction generator. Variability could exist in the number of steps for a given component, the text used for a single instruction, the image displayed with the text for a given image, the information required to generate a computer image, etc.

The sequencing, ordering or prioritizing of the steps is also resolved by assembly instruction generator 10. An exact EWI is generated for each required step. An encoded work instruction (EWI) contains information required for assembly instruction reader 25 to display an assembly instruction. Contained in the EWI is the identification of all images associated with the assembly step, the textual description of the assembly step, and information required for assembly instruction reader 25 to generate a computer drawn image for the assembly step. Example 4 shows an abstract example of an EWI and Example 5 shows two specific instances of EWI's.

("<textual description>" ("image ID 1" . . . "image ID n")<computer drawn image info>)

EXAMPLE 4

("Connect unit as highlighted below." ( )#3(cable(vme drive vme drive) ((0 0 1-2) (0 4-1)))) ("Verify/configure jumpers of 187 PWA as detailed below." ("m187.gen.szd") ( ))

EXAMPLE 5

Scheduler 15 performs two separate scheduling functions. The first scheduling function is to schedule which assembly steps for a single final product will be completed at which assembly station. This is realized by putting the set of EWI's associated with the assembly steps for an assembly station in its associated assembly station repository 20. In other words, scheduler 15 divides the sequence of EWI's into segments for each assembly station. The second scheduling function is to schedule the order in which multiple final products will be assembled. This is realized by creating a schedule essentially containing the sequence of final products and placing the schedule in the associated assembly station repository 20. The option to schedule the work load based on order or product priorities or maximum throughput is also selectable.

Scheduler 15 divides the entire sequence of EWI's for a final product into segments of EWI's. Each segment of EWI's is associated with the assembly steps that are to be completed at a single assembly station. The reason for creating the segments of EWI's is so that each final product can be progressively assembled at a number of assembly stations. Scheduler 15 divides the number of components comprising the final product by the number of assembly stations to be used and assigns all the steps associated with the components to the assembly station. For example, if components (a1 a2 b1 b2 b3 b4 c1) were being scheduled on assembly station 1 and assembly station 2, then steps for assembling components (a1 a2 b1 b2) would be scheduled on assembly station 1 and the steps for assembling components (b3 b4 c1) would be scheduled on assembly station 2. This is realized by putting the set of EWI's associated with the assembly steps for an assembly station in its associated assembly station repository 20.

Scheduler 15 creates a schedule for each assembly station which is appended to any previous schedule for the station on assembly station repository 20. When scheduling tool 5 puts a segment of EWI's in an assembly station repository 20, it is identified with the order number, build number, and segment number where each number is separated by a period. Zero based numbering is used so the first build would be represented by the number zero. For example the second segment of EWI's for the first build of order number 555 would be identified by 555.0.1.

There is a new schedule, current schedule, and schedule archive associated with each assembly station repository 20. More products can be scheduled to be assembled before assembly of previously scheduled products is completed. Scheduler 15 orders the final product and appends the list of EWI segment IDs associated with a given assembly station repository 20 to the new schedule. The order of the EWI segment IDs corresponds to the final product order. If product A and product B are to be scheduled to be assembled at assembly station 1 and assembly station 2 in the order (B A) then B.0.0 and A.0.0 would be appended to the end of the new schedule associated with assembly station repository 1. Furthermore, B.0.1 and A.0.1 would be appended to the end of the new schedule associated with assembly station repository 2.

When the assembler completes the last assembly instruction generated from the last EWI of any segment of EWI's, assembly instruction reader 25 checks to see if there are any EWI segment IDs in the new schedule. If there are, they are appended to the end of the current schedule and the new schedule is cleared. Next the EWI's associated with first EWI segment ID in the current schedule are loaded into assembly instruction reader 25. Finally the first EWI segment ID is removed from the current schedule and placed at the beginning of the schedule archive.

The new schedule, current schedule, and schedule archive allow for recovery from either normal or abnormal termination of assembly instruction reader 25. In other words, all of the displays and/or the host computer can go down and when the display or host is brought up, the individual assembly station readers will pickup where they left off.

Once the assembly instructions are divided by scheduler 15, an assembly instruction reader 25 associated with each of the assembly stations 60 displays the assigned EWI's. The encoded EWI's are converted into text segments, annotated photograph quality images and pictures dynamically generated by the reader. Each EWI is tailored to the work needed to be accomplished. This eliminates a need for assemblers to determine independently how the product is being built including where parts are located, what jumper setting to use and how components fit together, for example.

Static instruction repository 35 contains EWI segments that were manually developed. Assembly instruction reader 25 has an option which allows the assembler to select which static EWI segment is to be loaded into assembly instruction reader 25. Once the EWI segment is loaded, assembly instruction reader 25 converts each EWI into an assembly instruction. The conversion is completed only when the EWI is to be displayed. Static EWI segments are very useful for pre-assembling sub-assemblies or for final products whose assembly process is always exactly identical.

Conversion of the EWI entails showing the textual description of the assembly step on the hardware display, retrieving the raw image data associated with the image IDs for the EWI, loading the first image to the hardware display, or generating a raw image data from the computer drawn image information and loading the image to the hardware display. When multiple image views are associated with an assembly step, the subsequent images are loaded to the hardware display as selected by the arrow buttons on assembly instruction reader 25.

An administration tool is a graphical user interface (GUI) based application used to maintain the information base used by assembly instruction generator 10. As mentioned before, the administration tool is a separate independent program. The administration tool is used to create the abstract EWI's for the individual products and sub-assemblies, and other information (variable graphic names, etc.) that comprise the information base. This tool writes out source code that is part of the source code for scheduling tool 5. For example if the source for scheduling tool 5 is contained in files A, B and C, where file B contains the information base code, then if modifications/additions are made using the administration tool, a new file B would be written out. With Scheme (an advanced programming language) one can start the program by either loading source files (which are compiled on the fly) or by loading pre-compiled versions of the files. In actuality, the administration tool can write out the source file B.ss and compile the file into B.so or effectively B. This tool is also used to generate static EWI's that are available to all reader applications.

Schedule editor 12 of scheduling tool 5 is responsible for adding and deleting work segments from the list of new schedule, current schedule and schedule archive lists. A production manager can view the lists and update the schedule accordingly.

The following example is used to show how to generate instructions for painted wooden block sculptures. There are only two types of components that can used, cubes and cylinders. Variability is provided in the abstract assembly steps via variable parameters capable of representing different component information, as explained herein, and having the format <variable parameter>, as shown below. Components can be painted either red, yellow or blue.

The abstract assembly steps for a cube are:

1) Paint background of block <color>. {graphics to be used} (paint-block.<color>, spray-can.image) {computer drawn image} none
2) Place letter stencil on one face of block and paint <color>. {graphics to be used} (paint-stencil.<letter>.<color>) {computer drawn image} none
3) Place double sided tape on bottom of block as shown below. <conditional (second location>0)>{graphics to be used} (tape-block.<color>) {computer drawn image} none
    4) <show-current-position>{graphics to be used}( ) {computer drawn image} <show placement>

The abstract assembly steps for a cylinder are:

1) Paint cylinder <color>. {graphics to be used} (paint-cylinder.<color>, spray-can.image) {computer drawn image} none
2) Place tape on bottom of cylinder as shown below. {graphics to be used} (tape-cylinder.<color>) {computer drawn image} none
3) <show-current-position>{graphics to be used} ( ) {computer drawn image} <show placement>

The conversion for a configuration model of:
block*L*0.0*P*color.red*P*letter.C*P*lettercolor.blue
   block*L*0.1*P*color.blue*P*letter.Z*P*lettercolor.yellow
   cylinder*L*0.2*P*color.yellow Would result in the following EWI sequence:

("Paint background of block red." (paint-block-red.img, spray-can.img) ( ))

("Place letter stencil on one face of block and paint blue." (paint-stencil-C-blue.img) ( ))

("Place block as shown highlighted below" ( )#2 (((block.red)) (0)))

("Paint background of block blue." (paint-block-blue.img, spray-can.img) ( ))

("Place letter stencil on one face of block and paint yellow."
   (paint-stencil-Z-yellow.img ( ))

("Place double sided tape on bottom of block as shown below"
   (tape-block-blue.img) ( ))

("Place block as shown highlighted below" ( )#2 (((block.red)(block.blue)) (1)))

("Paint cylinder yellow" (paint-cylinder-yellow.img, spray-can.img) ( ))

("Place tape on bottom of cylinder as shown below." (tape-cylinder-yellow.img)
   ( ))

("Place cylinder as shown highlighted below"
   ( )#2(((block.red)(block.blue)(cylinder.yellow)) (2)))

Any configuration model is composed of components; once each and every component is positioned, configured, and connected, the assembly for the product is complete. So the process of converting a configuration model is simply resolving all relevant assembly steps for all components and sub-systems (which are made up of components themselves). The assembly process follows the hierarchy of the physical locations unless an abstract step of a higher level component modifies the ordering.

In the example shown, each component line of the configuration model will be converted in order of their location since all three components are at the same level. For clarity the first component line of the configuration model will be described and then the conversion of the line will be explained.

In the first line, "block" is the component tag. This is used to select the set of abstract steps that are required and to replace any component description variability in the text portion of an EWI. The *L* is the physical location tag which is used in parsing the configuration line to obtain the location data. The 0.0 is the physical location data signifying the first component in the first build. If the physical location was 1.1.2, it would signify the third component in the second sub-system in the second build. The *P* is the property field tag which is used in parsing to identify the presence of a property. There are three different property type tags used: color, letter and letter color. The property type tag is used in the parsing process to identify which type of data follows. In the example the property data for color is "red", the property data for letter is "C", and the property data for letter color is "blue".

Since the component tag is "block", the four abstract EWI's for "block" all need to be fully resolved. The first abstract step has an unresolved portion of text, signified by the variable parameter <color>. The color property data "red" is used to resolve this variability. The first image used also has variability and uses the color property again. The resolution is to create an image ID where <color> portion is replaced with the color data and the image suffix.img is added yielding the id paint-block-red.img. This completes the resolution of the first abstract EWI which would yield the converted EWI shown above.

The second abstract EWI is converted similarly. The only difference is that it takes two different properties to resolve the image id, letter and color. As shown above the property data is used to resolve the variability and the .img suffix is added yielding the paint-stencil-C-blue.img image id.

The third abstract EWI is interesting in that the step is only resolved if the conditional is met. The condition being checked is that the second field of the location is greater than zero. Since the second field of the location is zero, the abstract EWI is skipped. Notice that in the converted EWI's the second "block" resolved the third abstract EWI for "block" components.

The fourth abstract EWI invokes a routine which analyzes the overall physical model and creates the necessary information that will be required by the assembly instruction reader 25 to generate a computer drawn image of how the product should appear at this point on the display. The routine also generates the appropriate text. The text in this case uses the component tag to resolve the variability of what component is being placed. There are no stored images required so this field is empty in the resultant EWI. The last field contains 2 sub fields the first is used to draw the product at this point and the second identifies which positions are to be highlighted.

Not shown in the previous example are cases where variability can be inferred and not directly resolved by data contained explicitly in the model. An example of this would be if there were container components that always contained one or more components of like type. Consider the two following configuration model lines:

container*L*0.0
    ball*L*0.0.1*P*color.red

It can be inferred because "ball" at location 0.0.1 is physically configured in container at location 0.0, that container is a "ball" container. An abstract EWI could invoke a routine to do the analysis and resolve the container type. The examples shown were simplistic to communicate the ideas but are in no way limited to the syntax or implementation described.

It will be appreciated by those skilled in the art that the present invention dynamically generates and schedules products on a per order bases. Because the assembler on the assembly line follow step-by-step instructions, unique configurations can be ordered or process changes can be modified without creating any impact on manufacturing. Engineering can effectively generate and control the manufacturing process by defining what can and cannot be configured. This dynamic manufacturing method dramatically reduces the cycle time in manufacturing a product while providing the capability for a customer to define the desired final product. Accordingly, it is intended by the appended claims to cover all modifications of the invention which fall within the true spirit and scope of the invention.

What is claimed is:

1. A method, performed by a computer, for assembling a product having components, the method comprising the steps of:

(a) providing one or more abstract assembly steps for assembling the product, the abstract assembly steps containing variable portions for assembling the product with potentially different configurations, the variable portions including variable parameters capable of representing different component information, text information explaining how to assemble or connect one or more of the components of the product, and the variable portions further including at least one of an identifier of one or more computer graphics images to be displayed indicating how to assemble or connect one or more of the components of the product, and machine-readable instructions for the computer to draw and display one or more computer graphics images indicating how to assemble or connect one or more of the components of the product;

(b) obtaining a configuration model corresponding to a requested configuration of the product, the configuration model including one or more component information lines corresponding to one or more of the components utilized in the requested configuration, each of the component information lines containing at least one of a component tag identifying a component to be used in the requested configuration, a physical location field providing precise placement information for the component to be used in the requested configuration, a property field indicating a property of the component to be used in the requested configuration and a connection field indicating all locations to which the component to be used in the requested configuration is to be connected; and (c) applying the configuration model to the abstract assembly steps provided for assembling the product by inserting component information from the component information lines into the variable parameters of the variable portions of the abstract assembly steps to produce one or more assembly instructions for assembling the product to have the requested configuration.

2. The method of claim 1 wherein step (a) comprises providing one or more abstract assembly steps containing variable portions including both an identifier of one or more computer graphics images to be displayed indicating how to assemble or connect one or more of the components of the product, and one or more machine-readable instructions for the computer to draw and display one or more computer graphics images indicating how to assemble or connect one or more of the components of the product.

3. The method of claim 1 wherein step (b) comprises obtaining a configuration model including one or more component information lines containing a component tag identifying a component to be used in the requested configuration and containing a physical location field providing precise placement information for the component to be used in the requested configuration.

4. The method of claim 1 wherein step (b) comprises obtaining a configuration model including one or more component information lines containing a component tag identifying a component to be used in the requested configuration, containing a physical location field providing precise placement information for the component to be used in the requested configuration and containing a property field indicating a property of the component to be used in the requested configuration.

5. The method of claim 1 wherein step (b) comprises obtaining a configuration model including one or more component information lines containing a component tag identifying a component to be used in the requested configuration, containing a physical location field providing precise placement information for the component to be used in the requested configuration, containing a property field indicating a property of the component to be used in the requested configuration and containing a connection field indicating all locations to which the component to be used in the requested configuration is to be connected.

6. The method of claim 1 wherein step (b) comprises obtaining a configuration model including one or more component information lines containing a component tag identifying a component to be used in the requested configuration, containing a physical location field providing precise placement information for the component to be used in the requested configuration and containing a connection field indicating all locations to which the component to be used in the requested configuration is to be connected.

7. The method of claim 1 wherein step (b) comprises obtaining a configuration model including one or more component information lines containing a component tag identifying a component to be used in the requested configuration and containing a property field indicating a property of the component to be used in the requested configuration.

8. The method of claim 1 wherein step (b) comprises obtaining a configuration model including one or more component information lines containing a component tag identifying a component to be used in the requested configuration containing a property field indicating a property of the component to be used in the requested configuration and containing a connection field indicating all locations to which the component to be used in the requested configuration is to be connected.

9. The method of claim 1 wherein step (b) comprises obtaining a configuration model including one or more component information lines containing a component tag identifying a component to be used in the requested configuration and containing a connection field indicating all locations to which the component to be used in the requested configuration is to be connected.

10. A method, performed by a computer, for assembling a product having components, the method comprising the steps of:

(a) providing one or more abstract assembly steps for assembling the product, the abstract assembly steps containing variable portions for assembling the product with potentially different configurations, the variable portions including variable parameters capable of representing different component information;

(b) obtaining a configuration model corresponding to a requested configuration of the product, the configuration model including one or more of the component information lines corresponding to one or more components utilized in the requested configuration; and (c) applying the configuration model to the abstract assembly steps provided for assembling the product by inserting component information from the component information lines into the variable parameters of the variable portions of the abstract assembly steps to produce one or more assembly instructions for assembling the product to have the requested configuration.

11. The method of claim 10 wherein step (a) includes providing one or more abstract assembly steps having variable portions which include text information explaining how to assemble or connect one or more of the components of the product.

12. The method of claim 10 wherein step (a) includes providing one or more abstract assembly steps having variable portions which include an identifier of one or more computer graphics images to be displayed indicating how to assemble or connect one or more of the components of the product.

13. The method of claim 10 wherein step (a) includes providing one or more abstract assembly steps having variable portions which include machine-readable instructions for the computer to draw and display one or more computer graphics images indicating how to assemble or connect one or more of the components of the product.

14. The method of claim 10 wherein step (b) comprises obtaining a configuration model including one or more component information lines which contain a component tag identifying a component to be used in the requested configuration.

15. The method of claim 10 wherein step (b) comprises obtaining a configuration model including one or more component information lines which contain a physical location field providing precise placement information for a component to be used in the requested configuration.

16. The method of claim 10 wherein step (b) comprises obtaining a configuration model including one or more component information lines which contain property field indicating a property of a component to be used in the requested configuration.

17. The method of claim 10 wherein step (b) comprises obtaining a configuration model including one or more component information lines which contain a connection field indicating all locations a component to be used in the requested configuration is to be connected to.

18. The method of claim 10 wherein step (c) comprises assigning the assembly instructions to different assembly stations based on a workload of each of the stations.

19. The method of claim 10 wherein step (c) comprises assigning the assembly instructions to the assembly stations based on a priority assigned to the product.

* * * * *